United States Patent [19]

Cunningham

[11] 4,399,252
[45] Aug. 16, 1983

[54] METHOD OF EMPLOYING PROCESS OILS FROM CONVERTED WASTES IN SYNTHETIC RUBBERS

[75] Inventor: John J. Cunningham, Wayne, Pa.

[73] Assignee: Petrocon Corporation, Valley Forge, Pa.

[21] Appl. No.: 247,202

[22] Filed: Mar. 24, 1981

[51] Int. Cl.$^3$ ................................................. C08K 5/01
[52] U.S. Cl. .................................... 524/484; 524/571; 524/575; 208/184
[58] Field of Search ......................... 524/484, 571, 575

[56] References Cited

U.S. PATENT DOCUMENTS

| | | | |
|---|---|---|---|
| 3,449,283 | 6/1969 | Geerards et al. | 524/484 |
| 3,541,032 | 11/1970 | Pampus et al. | 524/484 |
| 3,706,653 | 12/1972 | Mills et al. | 524/484 |
| 4,001,167 | 1/1977 | Tungseth et al. | 524/484 |
| 4,017,446 | 4/1977 | Rion | 524/484 |

Primary Examiner—Melvyn I. Marquis
Assistant Examiner—Herbert J. Lilling
Attorney, Agent, or Firm—Ratner & Prestia

[57] ABSTRACT

Process oil is made by conversion from "waste" materials, particularly used oils, and most particularly used crankcase oils, by flash evaporation at about 250° F. and filtration for removal of solids therefrom, to produce a product substantially free of water and low boiling point components and of contaminant solids, which has a flash point above 310° F., or is blended with other products from the same process to produce a final product having a flash point above 310° F., and an aromatic content above 10%, preferably above 20%, by weight. The product may be used generally in a wide variety of process oil applications but is most particularly adapted for use as a rubber process oil and such use is also part of the present invention.

3 Claims, No Drawings

METHOD OF EMPLOYING PROCESS OILS FROM CONVERTED WASTES IN SYNTHETIC RUBBERS

BACKGROUND OF THE INVENTION

This invention pertains to process oils, particularly extenders, made from re-processed used oil products. This invention pertains also to the method of making such products and to the use of the re-processed used oil products as process oils and extenders. In particular, this invention pertains to the use of a re-processed used oil product as a rubber process oil and extender in virgin and reclaimed rubber products.

Process oils generally are refined petroleum products useful as additives to, or in formulating a variety of products including, ink, rubber, plastic, and resins. Oils used in roofing and paving compositions may also be included, although the specifications for oils in these uses are believed to be somewhat broader than for those uses previously referred to. When used as additives to inks, resins, rubbers, and particularly reclaimed rubbers, the "process oil" may function, at least in part, as a volume enhancer and plasticizer. Perhaps for this reason, process oils used in this fashion are sometimes referred to as "extenders". Hereafter, these terms are sometimes used interchangeably.

Process oils heretofore have been formulated generally from virgin oil stock, or to some small degree from re-refined (i.e., treated for additive and solid removal and distilled, stabilized and decolorized, generally by vacuum distillation) used petroleum products, to meet a wide variety of product specification.

An important characteristic of a process oil is its content of aromatic compounds. Preferably a significant proportion of aromatic compounds is included, so that the product has some degree of miscibility and solubility for other hydrocarbons in the host composition, in which the process oil is to be used. The aromatic content of typical process oils may vary from about 10% to about 80%, but in general an aromatic compound content on the order of 10% or more provides sufficient aromaticity for most process oil applications.

Another common specification for most process oils is color, to avoid discoloration of the parent composition by the process oil. It may be that this general characteristic of process oils has been at least in part responsible for the fact that most process oils heretofore used have been light in color. This in turn may be responsible for the fact that process oils are generally formulated, as previously indicated, from virgin oil blending stocks or chemically treated and vacuum distilled, stabilized, decolored, re-refined used oil products. (In contrast, used oils which are simply re-processed as described herein are generally black or dark in color.)

It is therefore a general object of the present invention to provide a process of manufacture, a resultant new product, and a new use of an old product (to the extent the product may be old), the process comprising re-processing used oils to produce a product which is useful in a variety of process and extended applications.

In particular, it is an object of the present invention to provide a method of making a rubber process oil and/or extender by re-processing used oils and to provide a new use for processed used oil products.

BRIEF DESCRIPTION OF THE INVENTION

These and other objects, which will be apparent in the course of the subsequent description of the invention, are met by a method of reprocessing wherein used oil, particularly used crankcase oil is reprocessed by removing water and light ends therefrom, preferably by flash evaporation, and removing solids therefrom, preferably by filtration. Either by selection of feedstock to the process or by blending a variety of feedstocks or by blending product therefrom, a product is produced having a flash point above 310° F. and this product is highly useful as a process oil, particularly as a rubber process oil and/or extender. The product generally has an aromatic content above 10% preferably above 20%, by weight.

Preferably also, the product is made by treating used oils in a process, the feedstock to which comprises a substantial proportion of used lubricating oil or used crankcase oil. In the process, the feedstock is flash evaporated by injecting the feedstock in liquid form at a temperature of about 250° F. through a venturi nozzle and removing the vapor product. Subsequently, the liquid is subjected to a solids separation step, preferably filtration, and most preferably mechanical filtration on a vibrating 150 mesh screen.

A preferred embodiment of the invention is in the use of this product as a rubber extender. The product of the invention itself is a process oil comprised of a re-processed waste oil, at least in part waste lubrication oil, which is substantially free of water, other low boiling constituents and solid contaminants, and which has an aromatic content about 10% and a flash point above 310° F., as measured in a Cleveland Open Cup Flash Tester and Standard ASTM Procedure.

DETAILED DESCRIPTION OF THE INVENTION

For a better understanding of this invention, reference may be made to the following detailed description thereof, taken in conjunction with the appended claims.

More specifically, the present invention involves reprocessing a wide variety of spent petroleum products, particularly used oils and most particularly used crankcase oils. The feedstock may include other lube stocks, however, and may also include napthenic oils, cutting oils, machine oils, grinding oils, transmission fluids, turbine oils, and other types of hydraulic fluids. While the feedstock for the present process does not require that such oils be previously used, it is of course quite obvious that the practicality of the present process is based on the conversion of used forms (or "waste" quantities otherwise not useful as formulated) of those materials. Thus materials which otherwise would be waste materials, are converted into useful and commercially saleable products.

This is done by what is referred to herein as re-processing, as distinguished from re-refining. In re-processing, some constituents of these used oils are removed, such as by evaporation of light ends and water and removal of solid or sedimentary material. This has been done heretofore for many years to convert such used oils into a low-grade fuel oil and to provide an intermediate product for re-refining, by vacuum distillation, of the used product into an additive-free base-stock for further compounding into refined lubricating, motor hydraulic, or machine oils.

In particular, a process has been in use for many years by the assignee of the present invention, wherein used oils are flash evaporated at about 250° F. filtered, on a vibrating 150 mesh screen. Undoubtedly, at least some, but not all, of this product, which has been sold or used almost entirely as a low-grade fuel oil, has had a flash point above 310° F. and an aromatic content above 10%.

It has now been found that such a product, and this process for making such a product, are highly useful for the economic conversion of used oils to products suitable for use as process oils, and particularly as rubber process oil and/or extender.

As used heretofore, this process, in the manufacture of low-grade fuel oil or an intermediate product for further refining by distillation, has not been conducted with a view to producing a product of any particular flash point or aromaticity. It is now known that the product of this process, as previously practiced, in many cases included a flash point below 210° F., a characteristic which would have rendered the product unsuitable for general application as a process oil. The process of the present invention therefore requires control of the process, either by selection and/or blending of feedstocks and/or blending of product from different feedstocks, or by the selection of the process step for water and light end removal, so that the final product does have a flash point above 310° F.

While other processes may be used to convert used oils to process oil, and particularly to a rubber process oil and/or extender oil, by removing water and low boiling components thereof (such as those hydrocarbon constituents boiling in the general temperature range with water) and solids removal, such as by filtration or chemical treatment, the preferred process is that disclosed herein. In this process, the waste oil feedstock is introduced into a flash evaporator in which continuously recirculating fluid is subjected to rapid depressurization by passage through a venturi nozzle and into the vapor phase of the flash evaporator, from which vapor constituents are continuously removed. The recirculating liquid is maintained at 250° F. and incoming feedstock is combined with recirculating liquid as a relatively low proportion, less than 50%, of the fluid entering the venturi nozzle. Liquid prooduct is drawn from the collected condensate in the flash evaporator on a continuous basis. This liquid product is then subjected to solids removal by passage through a vibrating 150 mesh filter screen, which is slightly sloped to permit sludge flow therefrom. This screen includes circulating mechanical elements in the bottom thereof to enhance fluid movements therethrough. Periodically, the filter is shut down for cleaning.

In accordance with the process of this invention, if the initial product has a flash point below 310° F., it is blended with other products from the same process having a flash point sufficiently above that temperature so that the blended product has a flash point above 310° F.

As a precaution, the product is preferably subjected to further filtration, through a mechanical filter element having openings somewhat larger than the 150 mesh vibrating screen, prior to shipment to the customer.

The normal feed and normal product from this process is preferably a medium viscosity material, about SAE 30. As previously indicated, the feedstock may be any of a wide variety of used oils, including crankcase oils, cutting oils, machine oils, grinding oils, transmission fluids, other hydraulic fluids, and naphthenic oils. All of these potential feedstock materials, with the possible exception of the naphthenic oils, are largely parafinic in nature but all include, at least to some degree, aromatic compounds.

It is believed that apart from flash point, one essential characteristic of process oil, made from converted used oils and useful as indicated herein, is that the process oil product must include a significant proportion of aromatic compoounds. In general, the aromatic proportion of these products, by weight, should be at least 10% and preferably at least 20%. In one typical case, the process oil product of this invention, intended, tested and used as a rubber process oil and/or extender, and made from a typical feedstock comprising a substantial proportion of used crankcase oil and lesser amounts of used oils of other types, was indicated, by test in accordance with ASTM D2007 (clay-gel absorption), to have an asphaltene content of zero and weight percent proportions of saturated organic compounds of 65%, aromatic compounds 27.7%, and polar compounds 7.3%. This of course is well within the range of the product characteristic deemed preferred for purposes of the present invention. This level of aromaticity is considered more than sufficient to provide the inter-miscibility and solvency of the process oil product of this invention, particularly when used as a rubber extender, with other cnstituents of typical host compositions.

In general, the present invention also comprises use of the process oil product described herein by compounding or blending this product, in a conventional manner and in conventional proportions (for process oils and extenders, as heretofore used) in host compositions including ink, resins, plastics, and rubber, particularly synthetic rubber and most particularly such rubber composed of polydiolefinic compounds, such as polybutadiene.

While this invention has been described with reference to specific embodiments thereof, it is not limited thereto and the appended claims are intended to be construed to encompass not only the specific forms of the invention described herein, but to such other forms and variations thereof as may be devised by those skilled in the art within the spirit and scope of the present invention.

Having described my invention, I claim:

1. A meethod of using previously used oil comprising treating said oil to remove water, low boiling point compounds, and solid contaminants therefrom to convert said previously used oil to a process oil having an aromatic content of at least 10 percent by weight and a flash point above 310° F., and incorporating said treated previously used oil as a process oil in a synthetic rubber composition.

2. A method, as recited in claim 1, wherein said previously used oil comprises primarily previously used crankcase oil.

3. A method, as recited in claim 2, wherein said synthetic rubber is comprised primarily of polybutadiene.

* * * * *

UNITED STATES PATENT AND TRADEMARK OFFICE
CERTIFICATE OF CORRECTION

PATENT NO. : 4,399,252
DATED : August 16, 1983
INVENTOR(S) : John J. Cunningham et al It is certified that error appears in the above—identified patent and that said Letters Patent is hereby corrected as shown below:

On the face of the patent, --Toms B. Royal-- should be included as an inventor.

Signed and Sealed this

First Day of November 1983

[SEAL]

Attest:

GERALD J. MOSSINGHOFF

Attesting Officer

Commissioner of Patents and Trademarks